United States Patent
Jurzak et al.

(10) Patent No.: US 11,095,681 B2
(45) Date of Patent: Aug. 17, 2021

(54) METHOD TO HANDLE THE DISTRIBUTED DENIAL-OF-SERVICE ATTACKS 911 ANSWERING CENTERS

(71) Applicant: MOTOROLA SOLUTIONS, INC., Chicago, IL (US)

(72) Inventors: Pawel Jurzak, Cracow (PL); Dominik Dziok, Cracow (PL); Adam Marynowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/768,092

(22) PCT Filed: Feb. 28, 2018

(86) PCT No.: PCT/PL2018/050006
§ 371 (c)(1),
(2) Date: May 29, 2020

(87) PCT Pub. No.: WO2019/168418
PCT Pub. Date: Sep. 6, 2019

(65) Prior Publication Data
US 2020/0389488 A1 Dec. 10, 2020

(51) Int. Cl.
*H04M 3/51* (2006.01)
*H04M 3/436* (2006.01)
(Continued)

(52) U.S. Cl.
CPC ........ *H04L 63/1458* (2013.01); *H04M 3/436* (2013.01); *H04M 3/5116* (2013.01);
(Continued)

(58) Field of Classification Search
None
See application file for complete search history.

(56) References Cited

U.S. PATENT DOCUMENTS

| 7,653,188 B2 | 1/2010 | Kloberdans et al. |
| 8,913,493 B2 * | 12/2014 | Haltom ................. H04M 3/436 370/230 |

(Continued)

FOREIGN PATENT DOCUMENTS

CN 101917309 B 12/2010

OTHER PUBLICATIONS

The International Search Report and the Written Opinion corresponding patent application No. PCT/PL2018/050006 filed Feb. 28, 2018, all pages.

*Primary Examiner* — Quoc D Tran

(57) ABSTRACT

An emergency answering center and a method of handling a distributed denial of service attack on an emergency answering center are provided. The emergency answering center receives an emergency call from a current caller. The emergency answering center determines websites visited by the current caller prior to calling the emergency answering center. If the number of calls received at the emergency answering center within a predetermined time period exceeds a predetermined threshold, the emergency answering center compares the websites visited by the current caller prior to calling the emergency answering center to a list of websites visited by other callers within the predetermined time period. If the websites visited by the current caller match at least a subset of the list of websites visited by other callers within the predetermined time period, the emergency answering center processes the emergency call in an alternate manner that is different from the regular manner of processing emergency calls.

13 Claims, 3 Drawing Sheets

(51) Int. Cl.
  *H04W 4/90*        (2018.01)
  *H04L 29/06*       (2006.01)
  *H04W 76/50*       (2018.01)

(52) U.S. Cl.
  CPC ............ *H04W 4/90* (2018.02); *H04W 76/50* (2018.02); *H04L 2463/144* (2013.01); *H04M 2201/12* (2013.01); *H04M 2242/04* (2013.01)

(56) References Cited

U.S. PATENT DOCUMENTS

| | | | |
|---|---|---|---|
| 9,154,615 B1* | 10/2015 | Hegde | H04M 3/51 |
| 9,521,162 B1 | 12/2016 | Zand et al. | |
| 2006/0039540 A1 | 2/2006 | Issinski | |
| 2007/0041516 A1* | 2/2007 | Dickinson | H04M 3/436 |
| | | | 379/45 |
| 2010/0128862 A1 | 5/2010 | Vendrow | |
| 2013/0083902 A1* | 4/2013 | Goswami | H04W 4/029 |
| | | | 379/37 |
| 2013/0216027 A1 | 8/2013 | Rados et al. | |
| 2014/0003587 A1* | 1/2014 | Poremba | H04M 3/493 |
| | | | 379/45 |
| 2014/0044017 A1 | 2/2014 | Haltom | |
| 2014/0286484 A1* | 9/2014 | Ehrlich | H04M 3/436 |
| | | | 379/142.06 |
| 2015/0215334 A1 | 7/2015 | Bingham et al. | |
| 2015/0249737 A1* | 9/2015 | Spievak | H04M 3/436 |
| | | | 379/189 |
| 2016/0150414 A1* | 5/2016 | Flaks | H04M 15/58 |
| | | | 455/406 |
| 2017/0026404 A1 | 1/2017 | Peeler | |

\* cited by examiner

METHOD TO HANDLE THE DISTRIBUTED DENIAL-OF-SERVICE ATTACKS 911 ANSWERING CENTERS

BACKGROUND OF THE INVENTION

Denial-of-service attacks on 911 answering centers tie-up 911 phone lines and cause problems for people with real emergencies. Such attacks can be caused by a computer virus activated by clicking a link on the internet.

It is difficult, however, to determine which emergency callers are legitimate and which are part of a denial-of-service attack. If resources are utilized on a bogus caller, then legitimate callers are being delayed in getting a response to their emergency situation. But if a call is a legitimate emergency call and is treated like a denial-of-service attack call, then a legitimate emergency may be delayed or ignored.

Therefore, a need exists for a method of determining if calls to a 911 answering center are legitimate emergency calls or are part of a denial-of-service attack.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
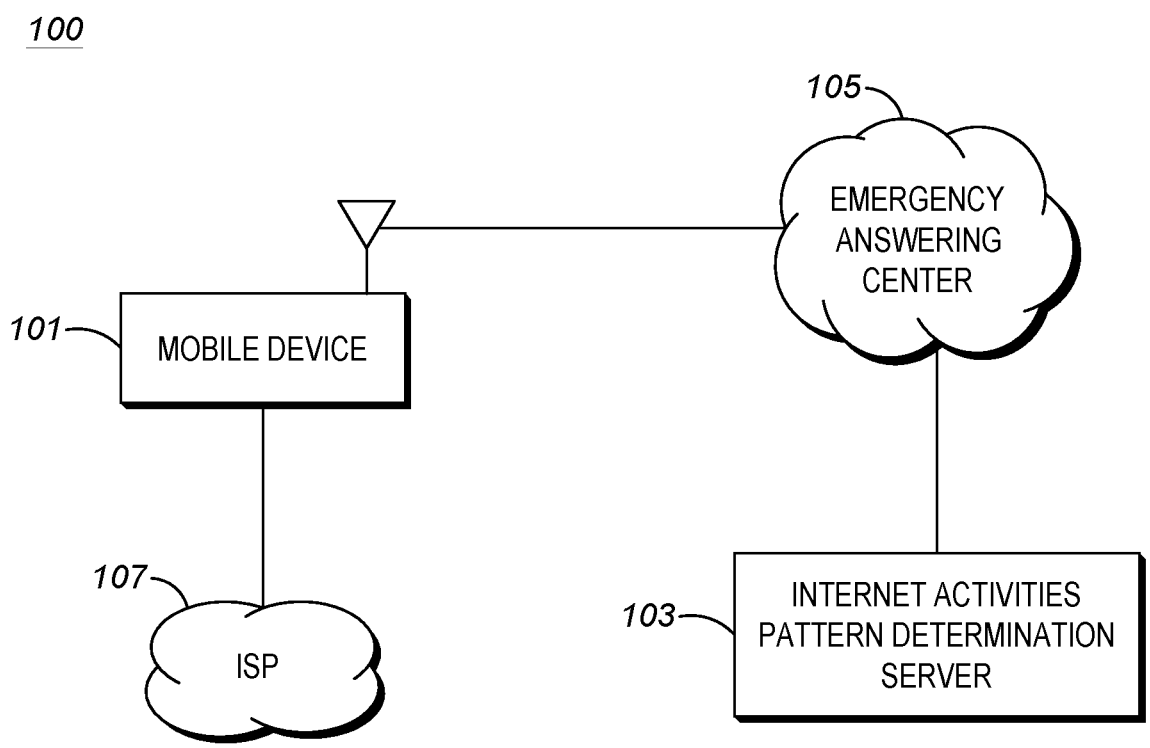
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 preferably comprises mobile device 101, Internet Activities Pattern Determination Server 103, Emergency Answering Center 105, and Internet Service Provider (ISP) 107.

Mobile device 101 can be a smart phone, a tablet, or any other mobile device that is capable of placing emergency calls.

Internet Activities Pattern Determination Server 103 is a server that determines the websites visited by mobile device 101 and is able to process the websites visited by multiple mobile devices to determine if a pattern exists across a plurality of mobile devices. In accordance with an exemplary embodiment, Internet Activities Pattern Determination Server 103 is called when an extremely high number of emergency calls are placed in a narrow time window. Internet Activities Pattern Determination Server 103 looks at the internet history of the mobile devices that have recently placed an emergency call to determine if there is a common website that has been accessed by a number of the emergency callers. If so, Internet Activities Pattern Determination Server 103 assumes that a denial-of-service attack is underway and proceeds in a manner to stop the denial-of-service attack.

Emergency Answering Center 105 is a Public Safety Answering Point (PSAP). Emergency Answering Center 105 is a call center responsible for answering calls to an emergency telephone number for police, firefighting; and ambulance services.

ISP 107 is a service that provides access to and use of the Internet. ISP 107 typically provides Internet services such as Internet access, Internet transit, domain name registration, web hosting, Usenet service, and collocation.

Figure 2:
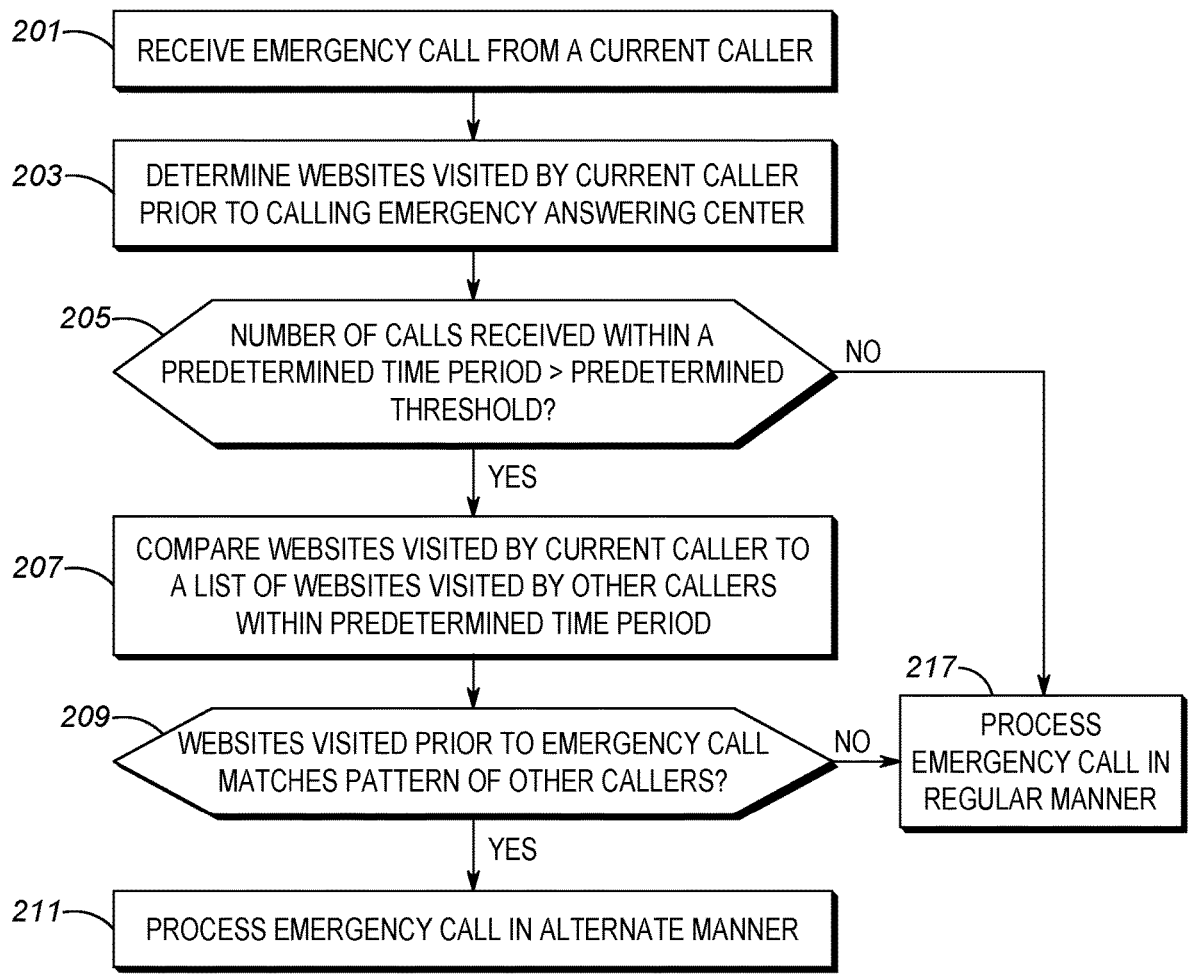
FIG. 2 depicts a flowchart in accordance with an exemplary embodiment of the present invention.

FIG. 2 depicts a flowchart 200 in accordance with an exemplary embodiment of the present invention.

Emergency Answering Center 105 receives (201) an emergency call from a current caller 101.

Emergency Answering Center 105 determines (203) websites that were visited by current caller 101 prior to calling Emergency Answering Center 105. In accordance with an exemplary embodiment, Emergency Answering Center 105 utilizes an application that sends additional information to Emergency Answering Center 105, such as MSI Emergency CallWorks CallStation. In this exemplary embodiment, the application provides the recent internet activity, preferably in the form of the IP addresses of websites recently visited, for mobile device 101 that is making the current emergency call. In this manner, in addition to providing to Emergency Answering Center 105 the parameters like location, the Internet Service Provider (ISP) name and IP address used recently can also be provided, in addition to recent internet activities.

Emergency Answering Center 105 determines (205) if the number of calls received within a predetermined time period is greater than a predetermined threshold. When a number of calls received by Emergency Answering Center 105 within a predetermined time period exceeds a threshold, a denial-of-service attack could be occurring. In accordance with an exemplary embodiment, the predetermined threshold is set to 100, although any suitable number above the usual number of calls received during a busy period can be used. In this exemplary embodiment, a new link may be added to a social media site, such as TWITTER, that redirects users to repeatedly place a 911 call when the link is clicked. At this point, the number of emergency calls to Emergency Answering Center 105 would increase significantly, to the point where the number of calls exceeds the number of dispatchers, and therefore legitimate calls are not being processed because of the influx of denial-of-service calls.

If Emergency Answering Center 105 determines at step 205 that the number of emergency calls is not greater than the predetermined threshold, Emergency Answering Center 105 processes (217) the emergency call in the regular manner.

If Emergency Answering Center 105 determines at step 205 that the number of emergency calls is greater than the predetermined threshold, Internet Activities Pattern Determination Server 103 compares (207) websites visited by current caller 101 to a list of websites visited by other callers within the predetermined time period. In this exemplary embodiment, when a denial-of-service attack is sensed, Internet Activities Pattern Determination Server 103 determines the internet activity pattern of mobile device 101 that preceded the call to Emergency Answering Center 105. In an alternate exemplary embodiment, the recent internet activities of mobile device 101 can be provided by a software application such as MSI Emergency CallWorks. Internet Activities Pattern Determination Server 103 preferably utilizes internet connection records (ICRs) using a search engine known as a request filter.

Internet Activities Pattern Determination Server 103 determines (209) if the websites visited prior to the emergency call matches the pattern of other emergency callers. The patterns can relate to the websites visited, the time spent at the websites, the time between visiting the website and placing the emergency call, or other factors relating to the visit to the common websites.

If Internet Activities Pattern Determination Server 103 determines at step 209 that the websites visited prior to the emergency call do not match the pattern of other emergency callers, Emergency Answering Center 105 processes (217) the emergency call in the regular manner.

If Internet Activities Pattern Determination Server 103 determines at step 209 that the websites visited prior to the emergency call match the pattern of other emergency callers, Emergency Answering Center 105 processes (211) the emergency call in an alternate manner. In a first exemplary embodiment, the call from the current caller, which has been determined to be part of a denial-of-service attack, is given a lower priority than other calls and will not be processed until all legitimate calls are processed. In a further exemplary embodiment, an additional check is performed to verify if the originator of the emergency call is a human caller. If not, the priority of the call is lowered in the waiting queue. Internet Activities Pattern Determination Server 103 may also notify appropriate public safety agencies to alert them to the attack and to request that the website propagating the denial-of-service attack be shut down.

Figure 3:
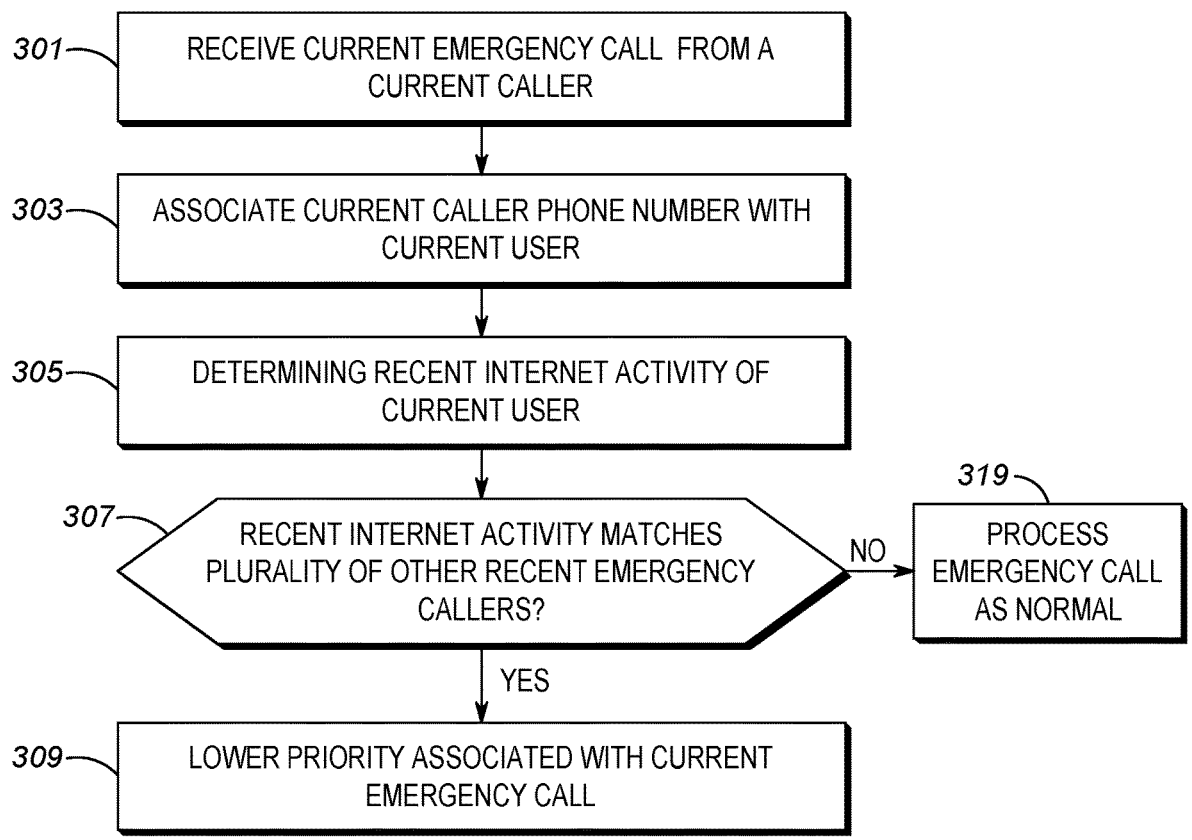
FIG. 3 depicts a flowchart in accordance with an exemplary embodiment of the present invention.

FIG. 3 depicts a flowchart 300 in accordance with an exemplary embodiment of the present invention.

Emergency Answering Center 105 receives (301) an emergency call from a current caller. For example, in the United States an emergency call is placed by a user dialing "911" on any telephone.

Emergency Answering Center 105 associates (303) the current caller phone number with a current user. In an exemplary embodiment, this is accomplished by checking a database and accessing the record associated with the caller phone number. This caller phone number will have an associated name of the person who owns this phone number.

Internet Activities Pattern Determination Server 103 determines (305) the recent internet activity of the current user. When a denial-of-service attack is sensed, the system automatically associates phone numbers with users and with the user's recent internet activity to identify if the user had visited a common page or internet service with other current callers. Mobile devices, such as mobile device 101, often use Voice Over IP (VoIP) to place the emergency call to Emergency Answering Center 105. In an exemplary embodiment, Internet Service Providers (ISPs) include a search engine, often referred to as the "request filter", that provides which websites were visited and when the websites were visited. In an exemplary embodiment, associating phone numbers with the recent internet activity of the mobile device is accomplished using software such as MSI Emergency CallWorks software.

Internet Activities Pattern Determination Server 103 associates phone numbers with the recent internet activity of mobile device 101 to identify if mobile device 101 had visited common websites as other current callers. Internet Activities Pattern Determination Server 103 determines (307) if recent internet activity of the current user matches the plurality of other recent emergency callers.

If Internet Activities Pattern Determination Server 103 determines at step 307 that the recent internet activity of the current user does not match the plurality of other recent emergency callers, Emergency Answering Center 105 processes (319) the emergency call as a normal emergency call.

If Internet Activities Pattern Determination Server 103 determines at step 307 that the recent internet activity of the current user matches the plurality of other recent emergency callers, Emergency Answering Center 105 lowers (309) the priority associated with the current emergency call.

In accordance with a further exemplary embodiment, a denial-of-service attack can be initiated when the denial-of-service virus is downloaded via a Wi-Fi connection and a dedicated application is not used for calling 911. In this exemplary embodiment the system determines the location of the caller, which IP addresses are used in this area, and whether there is any user that visited the IP addresses that followed the determined internet activity pattern. The IP addresses used in this area are preferably based on data from the ISP.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of handling a distributed denial of service attack on an emergency answering center, the method comprising:
    receiving an emergency call from a current caller at the emergency answering center;
    determining websites visited by the current caller prior to calling the emergency answering center;
    determining that a number of calls received at the emergency answering center within a predetermined time period exceeds a predetermined threshold;
    comparing the websites visited by the current caller prior to calling the emergency answering center to a list of websites visited by other callers within the predetermined time period;
    determining that a subset of the websites visited by the caller is included in the list of websites visited by other callers;
    determining, based on the number of calls received at the emergency answering center within the predefined time period and based on the determination that the subset of websites is included in the list of websites visited by other callers, that a denial of service attack originating from the subset of websites is occurring; and
    processing the emergency call in an alternate manner that is different from the regular manner of processing emergency calls based on the determination that the denial of service attack is occurring.

2. The method of handling a distributed denial of service attack on an emergency answering center in accordance with claim 1, the method further comprising storing the websites visited by the current caller prior to calling the emergency answering center in the list of websites visited by other callers.

3. The method of handling a distributed denial of service attack on an emergency answering center in accordance with claim 1, wherein the step of processing the emergency call in an alternate manner comprises assigning a lower priority to the emergency call than a priority of an emergency call being processed in the regular manner.

4. The method of handling a distributed denial of service attack on an emergency answering center in accordance with claim 1, the method further comprising the step of determining if the current caller is a human caller.

5. A method of handling a distributed denial of service attack on an emergency answering center, the method comprising:
    receiving a current emergency call from a current caller at the emergency answering center, the current caller having a current caller phone number;
    associating the current caller phone number with a current user;
    determining recent internet activity of the current user, wherein the recent internet activity includes an amount of time between visiting a website and placement of the current emergency call; and
    if the recent internet activity matches a plurality of other recent emergency callers, lowering a priority associated with the current emergency call.

6. The method of handling a distributed denial of service attack on an emergency answering center in accordance with claim 5, the method further comprising the step of determining that a number of calls received at the emergency answering center within a predetermined time period exceeds a predetermined threshold.

7. The method of handling a distributed denial of service attack on an emergency answering center in accordance with claim 5, wherein the step of determining if the recent internet activity matches a plurality of other recent emergency callers comprises determining if the recent internet activity matches the plurality of other recent emergency callers within a predetermined time period.

8. The method of handling a distributed denial of service attack on an emergency answering center in accordance with claim 5, wherein the step of associating the current caller phone number with a current user comprises associating the current caller phone number with a current user using recent internet activity on a mobile device.

9. The method of handling a distributed denial of service attack on an emergency answering center in accordance with claim 5, wherein the step of associating the current caller phone number with a current user comprises associating the current caller phone number with a current user by checking internet connection records via a gateway to the internet service provider.

10. An emergency answering center comprising:
a receiver configured to:
    receive an emergency call from a current caller at the emergency answering center; and
a processor configured to:
    determine websites visited by the current caller prior to calling the emergency answering center;
    determine that a number of calls received at the emergency answering center within a predetermined time period exceeds a predetermined threshold;
    compare the websites visited by the current caller prior to calling the emergency answering center to a list of websites visited by other callers within the predetermined time period;
    determine that a subset of the websites visited by the caller is included in the list of websites visited by other callers;
    determine, based on the number of calls received at the emergency answering center within the predefined time period and based on the determination that the subset of websites is included in the list of websites visited by other callers, that a denial of service attack originating from the subset of websites is occurring; and
    process the emergency call in an alternate manner that is different from the regular manner of processing emergency calls based on the determination that the denial of service attack is occurring.

11. The emergency answering center of claim 10, wherein the processor is further configured to store the websites visited by the current caller prior to calling the emergency answering center in the list of websites visited by other callers.

12. The emergency answering center of claim 10, wherein the processor is further configured to assign a lower priority to the emergency call than a priority of an emergency call being processed in the regular manner.

13. The emergency answering center of claim 10, wherein the processor is further configured to determine if the current caller is a human caller.

* * * * *